United States Patent

[11] 3,627,715

[72] Inventor Karl Brack
   Hyde Park, Wilmington, Del.
[21] Appl. No. 70,602
[22] Filed Sept. 8, 1970
[45] Patented Dec. 14, 1971
[73] Assignee Hercules Incorporated
   Wilmington, Del.
   Continuation-in-part of application Ser. No. 703,847, Jan. 29, 1968. This application Sept. 8, 1970, Ser. No. 70,602

[54] CROSS-LINKABLE COMPOSITIONS COMPRISING AN ETHYLENICALLY UNSATURATED POLYMER AND A SULFUR DIOXIDE ADDITION PRODUCT
11 Claims, No Drawings

[52] U.S. Cl. .................................................. 260/22 T,
   117/122 PA, 117/161 K, 117/161 R, 156/327, 156/338, 260/2 EP, 260/2 EC, 260/75 S, 260/75 UA, 260/78.4 R, 260/78.5 T, 260/79.3 R, 260/98, 260/769, 260/862

[51] Int. Cl. ...................................................... C07d 51/70,
   C08c 5/00, C08f 27/06
[50] Field of Search ........................................ 260/268 S,
   268 T, 22 A, 22 T, 98, 79.3 R, 78.5 T, 78.4 R, 769, 75 S, 75 UA, 2 EP, 2 EC, 77.5 AC, 862

[56] References Cited
UNITED STATES PATENTS

| | | | |
|---|---|---|---|
| 3,112,320 | 11/1963 | Farkas | 260/268 |
| 3,169,992 | 2/1965 | Henn | 260/268 |
| 3,459,684 | 8/1969 | Wilson | 260/2 |
| 3,528,964 | 9/1970 | Tesoro | 260/231 |

Primary Examiner—Donald E. Czaja
Assistant Examiner—Ronald W. Griffin
Attorney—John W. Whitson ABSTRACT: The disclosed compositions contain an ethylenically unsaturated polymer and an addition product of sulfur dioxide with certain bicyclic tertiary amines, representative of which is triethylenediamine. The compositions may be cross-linked by the application of heat.

CROSS-LINKABLE COMPOSITIONS COMPRISING AN ETHYLENICALLY UNSATURATED POLYMER AND A SULFUR DIOXIDE ADDITION PRODUCT

This application is a continuation-in-part of my U.S. application Ser. No. 703,847, filed Jan. 29, 1968.

The invention of the present application relates to cross-linkable polymer compositions and to a process of cross-linking said compositions. More particularly, this invention relates to cross-linkable compositions containing an ethylenically unsaturated polymer and an addition product of sulfur dioxide with certain bicyclic tertiary amines.

The aforementioned sulfur dioxide addition product is a compound represented by the formula:

I 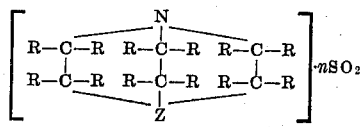

wherein Z is selected from the group consisting of the N and R—C radicals, each R is independently selected from the group consisting of hydrogen and $C_1$–$C_3$ alkyl radicals, $n$ is 1 when Z is the R—C radical, and $n$ is 1 or 2 when Z is the N radical. Specific embodiments of the sulfur dioxide addition product of this invention include the sulfur dioxide adducts of quinuclidine, 2-methylquinuclidine, 2-ethylquinuclidine, 2-propylquinuclidine, 3-methylquinuclidine, 3-ethylquinuclidine, 4-methylquinuclidine, 2,6-dimethylquinuclidine, 3,5-dimethylquinuclidine, 2,2,6-trimethylquinuclidine, and 3-ethyl-3-methylquinuclidine, and the mono- and di-(sulfur dioxide) adducts of 1,4-diazabicyclo[2.2.2]octane, 2-methyl-1,4-diazabicyclo[2.2.2]octane, 2-ethyl-1,4-diazabicyclo-[2.2.2]octane, 2-propyl-1,4-diazabicyclo[2.2.2]octane, 2,3-dimethyl-1,4-diazabicyclo[2.2.2]octane, 2,5-dimethyl-1,4-diazabicyclo[2.2.2]-octane, 2,6-dimethyl-1,4-diazabicyclo[2.2.2]octane, 2,5,7-trimethyl-1,4-diazabicyclo[2.2.2]octane, and 2,2,5,5,-tetramethyl-1,4-diazabicyclo[2.2.2]octane.

In general, these sulfur dioxide addition products are solid at 20°–25° C. and have melting points substantially above 20°–25 C. Under anhydrous conditions and at 20°–25° C. they are stable. However, water causes them to decompose, and at temperatures usually substantially above 20°–25° C. slow thermal decomposition occurs. They are substantially insoluble at 20°–25 C. in most organic solvents including acetone, methyl ethyl ketone, n-heptane, cyclohexane and toluene.

These sulfur dioxide addition products have utility as cross-linking agents for unsaturated polymers cross-linkable by sulfur dioxide. By admixing the sulfur dioxide addition product with a substantially uncross-linked, ethylenically unsaturated polymer, and establishing the temperature of the resulting mixture at a temperature at which takes place substantial thermal decomposition of the addition product, but not of the polymer, substantial cross-linking of the polymer is effected.

The sulfur dioxide addition products, except when with reference to formula I, $n$ is 1 and Z is the N radical, also have utility in curable or cross-linkable, ethylenically unsaturated, polymer compositions which comprise a latent base and a precursor of, for example, a polyfunctional nitrile N-oxide or nitrile imine. Such compositions are useful as sealants, adhesives and coatings. A latent base is material which in the absence of water and/or heat is inert relative to the other components of the composition, but which, upon contact with water and/or upon the application of heat, provides alkaline substance that reacts with a precursor component, for example, one or more compounds having more than one hydroximoyl halide, carbonylnitrolic acid or hydrazide halide groups, of the composition to form a cross-linking agent for example, one or more compounds having more than one nitrile N-oxide or nitrile imine groups, for the ethylenically unsaturated polymer component of the composition. In accordance with this invention, the addition products wherein there is an $SO_2$ component for each N radical forms part or all of the latent base in such compositions.

These products become effective alkaline substances in accordance with this invention either upon heating the compositions containing them or upon exposing such compositions to moisture.

Any unsaturated polymer, containing ethylenic unsaturation wherein there is at least one hydrogen radical attached to at least one of the carbon atoms of the ethylenic double bond, can be used in the compositions of this invention. Where fluidized compositions are desired, unsaturated polymers having a molecular weight range of from about 1,000 to about 20,000 are preferred. However, higher molecular weight polymers can be used in conjunction with small amounts of solvents and/or plasticizers to obtain the desired fluidity. Typical unsaturated polymers than can be used are polybutadiene-1,2, polybutadiene-1,4, styrene-butadiene copoylmers, isobutylene-isoprene copolymers, natural rubber, polyester resins such as maleate- and fumarate-containing polyesters and polyacrylates, butadiene-acrylonitrile copolymers, ethylene-propylene-dicyclopentadiene terpolymers, polychloroprene, polyisoprene, unsaturated alkyd resins such as tall oil alkyd resins, polyether copolymers and terpolymers containing at least two unsaturated epoxide constituents such as propylene oxide-allyl glycidyl ether copolymers and ethylene oxide-epichlorohydrinallyl glycidyl ether terpolymers, unsaturated urethane copolymers and blends of these polymers with each other. In some cases it may be desirable to use partially hydrogenated products of the above unsaturated polymer.

The precursor component utilized in those ethylenically unsaturated polymer compositions of this invention which depend upon formation of a polyfunctional nitrile N-oxide or nitrile imine to effect cross-linking is a polyfunctional hydroximoyl halide, carbonynitrilic acid or hydrazide halide. The polyfunctional hydroximoyl halides and carbonylnitrolic acids lead to formation of polyfunctional nitrile N-oxides, whereas the polyfunctional hydrazide halides lead to formation of polyfunctional nitrile imines.

In general, the precursor component of the compositions of this invention is a compound selected from the group consisting of

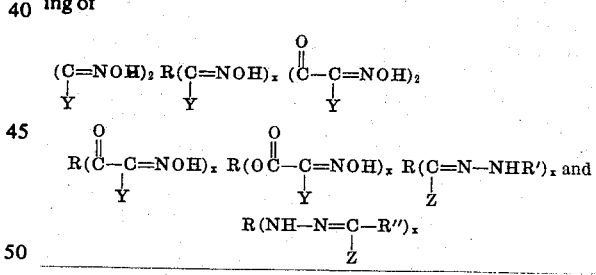

wherein Y is a substituent selected from the group consisting of halide and nitro, Z is a halide substituent, R is an organic radical having a valence greater than 1, generally 2 to 10 and preferably 2 to 6, and $x$ is an integer equal to the valence of R. The halide substituent may be fluoride, chloride, bromide or iodide. Also, R' is a radical selected from the group consisting of hydrogen, alkyl, cycloalkyl, aryl, alkaryl and aralkyl, and R'' is the same as R' except that it can not be hydrogen.

Generally, R is selected from the group consisting of the hydrocarbon, halide substituted hydrocarbon, hydrocarbon-oxy-hydrocarbon, hydrocarbon-thio-hydrocarbon, and hydrocarbon-sulfonyl-hydrocarbon polyvalent radicals. In preferred embodiments of this invention R is a divalent organic radical selected from the group consisting of alkylene radicals such as, for example, methylene, ethylene, trimethylene, tetramethylene, pentamethylene, hexamethylene, octamethylene, decamethylene, dodecamethylene and octadecamethylene; cycloalkylene radicals such as, for example, cyclohexylene, cyclopentylene, cyclooctylene and cyclobutylene; arylene radicals such as, for example, o-, m- and p-phenylene, naphthylene and biphenylene; arylene-dialkylene radicals such as, for example, o-, m- and p-xylylene diethylene and o-, m- and p-phenylene diethylene; alkylene-diarylene radicals such as, for example, methylene bis(o-, m- and p-phenylene) and ethylene bis(o-, m- and p-phenylene); cycloalkylene-dialkylene radicals such as, for example, 1,2-, 1,3- and 1,4-cyclohexane-dimethylene and 1,2- and 1,3-cyclopentane dimethylene; and the alkylene oxy-alkylene radicals, arylene-oxy-arylene radicals, alkarylene-oxy-arylene radicals, alkarylene-oxy-alkarylene radicals, aralkylene-oxy-alkylene radicals, and aralkylene-oxy-aralkylene radicals, as well as the corresponding thio and sulfonyl radicals, specific examples of which include methylene-oxy-methylene, ethylene-oxy-ethylene, phenylene-oxy-phenylene, methylenephenylene-oxy-phenylenemethylene, phenylenemethylene-oxy-methylenephenylene, ethylene-thio-ethylene, phenylene-thio-phenylene, phenylenemethylene-thio-methylene-phenylene and butylene-sulfonyl-butylene. The precursor of this invention also is inclusive of low molecular weight polymers having substituted along their chains about 2 to 5 groups selected from the class consisting of hydroximoyl halide groups, carbonyl-nitrolic acid groups and hydrazide halide groups.

As mentioned earlier, R' may be hydrogen, whereas R'' can not. Aside from this exception, R' and R'' may be the same and generally are selected from the group consisting of alkyl radicals containing one to 20 carbon atoms, such as methyl, butyl, nonyl, decyl and pentadecyl; cycloalkyl radicals such as cyclopentyl, cyclooctyl and cyclododecyl; aryl radicals having 1 to 3 rings, such as phenyl, biphenyl and naphthyl; alkaryl radicals having $C_1$–$C_{20}$ alkyl groups and 1 to 3 rings in the aryl group, such as methylphenyl and octadecylnaphthyl; and aralkyl radicals having $C_1$–$C_{20}$ alkyl groups and 1 to 3 rings in the aryl group, such as benzyl and naphthylhexamethylene.

Exemplary of the polyfunctional nitrile N-oxides formed from precursors having the formula

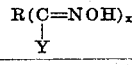

are the bis(nitrile N-oxides) such as terephthalo-bis(nitrile N-oxide), 2,3,5,6-tetramethylterephthalo-bis(nitrile N-oxide), isophthalo-bis(nitrile N-oxide), malono-bis(nitrile N-oxide), succino-bis-(nitrile N-oxide), glutaro-bis(nitrile N-oxide), 1,4-cyclohexane bis(carbonitrile N-oxide), methylene-bis(p,p'-benzonitrile N-oxide), methylene bis(m,m'-benzonitrile N-oxide), p-phenylene-bis(acetonitrile N-oxide), 4,4'-diphenylene-bis(carbonitrile N-oxide), and 1,5-naphthalene-bis(carbonitrile N-oxide); and polyfunctional nitrile oxides which have more than two nitrile oxide groups, such as 1,3,5-benzene-tris(carbonitrile N-oxide), 1,5,7-naphthalene-tris(carbonitrile N-oxide), penta(acrylonitrile N-oxide), deca(crotononitrile N-oxide), as well as polyfunctional nitrile oxides such as 2,2'-oxybis(ethyl carbonitrile N-oxide), i.e., 2,2'-bis(carbonitrile N-oxide) diethyl ether, 4,4'-oxybis-(phenyl carbonitrile N-oxide), i.e., 4,4'-bis(carbonitrile N-oxide) diphenyl ether, 2,2'-thiabis(ethyl carbonitrile N-oxide) and 4,4'-thiabis(phenyl carbonitrile N-oxide). Precursors having the formula

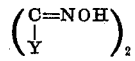

lead to the formation of the bis(nitrile N-oxide) identified as cyanogen N,N'-dioxide.

Exemplary of the polyfunctional nitrile N-oxides formed from precursors having the formula

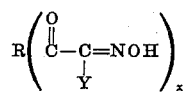

are malonyl-bis(carbonitrile N-oxide), succinyl-bis(carbonitrile N-oxide), adipyl-bis(carbonitrile N-oxide), sebacyl-bis(carbo-nitrile N-oxide), 1,2,3-propane-tris(carbonyl carbonitrile N-oxide), 1,2,4-pentane-tris(carbonyl carbonitrile N-oxide), 1,4-cyclohexane bis(carbonyl carbonitrile N-oxide), p-phenylene-bis(acetyl carbonitrile N-oxides), 2,2'-thiabis(acetyl carbonitrile N-oxide), 3,3'-thiabis(propionyl carbonitrile N-oxide), isophthalyl carbonitrile N-oxide, terephthalyl carbonitrile N-oxide, 4,4'-bis-(benzoyl carbonitrile N-oxide), 4,4'-methylene-bis(benzoyl carbonitrile N-oxide), 4,4'-oxybis(benzoyl carbonitrile N-oxide), 3,3'-thiabis(benzoyl carbonitrile N-oxide) and polymers containing pendant carbonitrile N-oxide groups, as for example, ethylene-acrylic acid copolymers and partially hydrolyzed poly(alkyl acrylate) where two or more of the pendant carboxyl groups have been converted to carbonyl carbonitrile N-oxide groups. Precursors of the formula

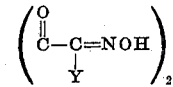

lead to the formation of oxalyl-bis(carbonitrile N-oxide).

Exemplary of the polyfunctional nitrile N-oxides formed from precursors having the formula

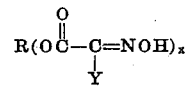

are, for example, the ethylene glycol, tetramethylene glycol, hexamethylene glycol, 1,4-cyclohexene glycol, resorcinol, 4,4'-dihydroxybiphenylene and isopropylidene-4,4'-bisphenol esters of carboxy carbonitrile N-oxides.

Exemplary of the polyfunctional nitrile imines formed from precursors having the formula

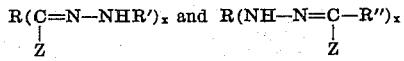

are bis(nitrile imines) such as -isophthalo-bis(N-phenylnitrile imine), terephthalo-bis(N-phenylnitrile imine), isophthalo-bis-(N-methylnitrile imine), terephthalo-bis(N-methylnitrile imine), isophthalo-bis(nitrile imine), terephthalo-bis(N-ethylnitrile imine, succino-bis(N-phenylnitrile imine), 1,4- and 1,3-cyclohexane-bis(N-phenylcarbonitrile imine), N,N'-bis(zenzylidene)-1,4-dihydrazinobenzene, and N,N'-bis(benzylidene)-1,3-dihydrazinobenzene; tetramethylene-bis(p-phenylene N-butyl carbonitrile imine); and polyfunctional nitrile imines having more than two nitrile imine substituents such as trimeso-tris(N-phenyl nitrile imine), trimeso-tris(N-methyl nitrile imine) and the corresponding tetra- and hexa-substituted compounds derived from acids such as 3,3',5,5'-tetracarboxybiphenyl and tris(3,5-dicarboxyphenyl)-methane.

Illustrative of specific precursor components used in those compositions of this invention which depend upon formation of a polyfunctional nitrile N-oxide or nitrile imine are bis-(hydrazide chlorides) such as isophthaloyl-bis(phenylhydrazide chloride), terephthaloyl-bis(phenylhydrazide chloride), isophthaloyl-bis(methylhydrazide chloride), isophthaloyl-bis(ethylhydrazide chloride), terephthaloyl-bis(methylhydrazide chloride), succinoyl-bis(phenylhydrazide chloride), adipoyl-bis(methylhydrazide chloride), p-phenylene dipropionyl-bis(methylhydrazide chloride), tetramethylene dibenzoyl-bis(butylhydrazide chloride), N,N'-p-phenylene-bis(benzoyl hydrazide chloride), N,N'-m-phenylene-bis(benzoyl hydrazide chloride), glutaryl-bis(phenylhydrazide chloride), and 1,4-cyclohexane dicarboxy-bis(phenylhydrazide chloride); and polyfunctional hydrazide chlorides containing more than two functional groups, such as trimesoyl-tris(phenylhydrazide chloride), trimesoyl-tris(methylhydrazide chloride) and trimesoyl-tris(ethylhydrazide chloride). These are all precursors to polyfunctional nitrile imines, but related precursors to polyfunctional nitrile N-oxides may be similarly illustrated.

Varied amounts of the unsaturated polymer, precursor and latent base can be employed, depending upon the degree of cross-linking desired and the nature of the unsaturated polymer. In general, the amount of nitrile N-oxide or nitrile imine precursor employed (based on the weight of the polymer) is from about 1 percent to about 30 percent, preferably from about 5 percent to about 20 percent. The latent base, which is the sulfur dioxide addition product of this invention, is present in an amount generally sufficient to effect conversion of substantially all the precursor to the corresponding nitrile N-oxide or nitrile imine, preferably in excess by about 20 percent to about 100 percent of the amount required to effect conversion of substantially of the precursor to the nitrile N-oxide or nitrile imine.

The sulfur dioxide addition products of this invention are made by admixing under anhydrous conditions compounds having the formula II
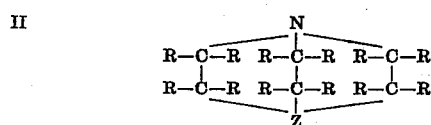

wherein Z and R have the same means as in Formula I, and sulfur dioxide. Compounds of formula II are known, and are either commercially available or can be made according to processes disclosed in the prior art. Sulfur dioxide reacts with compounds of formula II, when Z is the R—C radical, on a 1:1 mole basis. It reacts with compounds of formula II when Z is the N radical and $n$ is 2 on a 2:1 mole basis. In these two instances, it is preferred that the quantity of sulfur dioxide mixed with the compound or compounds be in stoichiometric excess. Sulfur dioxide reacts with compounds of formula II when Z is the N radical and $n$ is 1 on a 1:1 mole basis, and in this instance it is preferred that the quantity of sulfur dioxide admixed with the compound or compounds be substantially less than 1 mole per mole of the compound or compounds. The reaction takes place at 20°–25° C., although higher and lower temperatures can be employed. It also occurs at atmospheric pressure, although higher and pressures can be used. Preferably, the reaction is effected in a relatively inert, anhydrous liquid reaction medium in which the reactants are soluble, but in which addition product is substantially insoluble. Examples of such a liquid reaction medium include benzene, toluene, hexane and methylene chloride, as well as mixtures thereof.

This invention is further illustrated by the following specific examples of various aspects of this invention, including preferred specific embodiments. In these examples, all parts and percentages are by weight, unless otherwise expressly indicated.

EXAMPLE 1

This example illustrates the synthesis of the di(sulfur dioxide) adduct of 1,4-diazabicyclo[2.2.2]octane.

Twenty parts of 1,4-diazabicyclo[2.2.2]octane, also known as triethylenediamine, was dissolved in 356 parts of tetrahydrofuran. One hundred parts of Linde 4A molecular sieve pellets was added to the resulting solution to remove any water that might be present. The mixture of pellets and solution was kept in a closed vessel for 20 hours at 20°–25° C. The solution was decanted under nitrogen and then saturated with anhydrous sulfur dioxide gas. A precipitate formed. The precipitate was separated from the reaction mixture by filtration under nitrogen. The filter cake was then subjected for 2 hours at 20°–25° C. to a vacuum of 0.3 millimeter of mercury to remove residual solvent.

The resulting product was a white crystalline powder. It was essentially the di(sulfur dioxide) adduct of 1,4-diazabicyclo[2.2.2]octane. It had a melting point of 173°–174° C. Analysis of the product showed:

|  | %C | %H | %N | %S | %O |
|---|---|---|---|---|---|
| Calculated | 30.0 | 5.0 | 11.7 | 26.7 | 26.7 |
| Found | 31.1 | 5.7 | 11.7 | 26.7 | 26.2 |

The yield of product was 30.6 parts.

Other di(sulfur dioxide) adducts and the sulfur dioxide adducts of compounds of formula II when Z is the R—C radical are made in similar fashion.

EXAMPLE 2

This example illustrates the synthesis of the mono(sulfur dioxide) adduct of 1,4-diazabicyclo[2.2.2]octane.

Ten parts of 1,4-diazabicyclo[2.2.2]octane was dissolved in 300 parts of anhydrous hexane. Three parts of anhydrous sulfur dioxide was added to this solution. A voluminous white precipitate formed immediately. The precipitate was removed from the reaction mixture by filtration in an inert atmosphere, and then was subjected to 15 millimeters of mercury vacuum at 25° C. until substantially all residual solvent was removed. The product thus obtained was a white powder. It was essentially the mono(sulfur dioxide) adduct of 1,4-diazabicyclo[2.2.2]octane. The melting point of the product was 139.6°–140.4° C. Analysis of the product showed:

|  | %C | %N | %S |
|---|---|---|---|
| Calculated | 41.0 | 6.8 | 15.9 | 18.2 |
| Found | 40.4 | 7.2 | 15.4 | 18.4 |

The yield of product was 7.5 parts.

EXAMPLE 3

This example illustrates utilization of the sulfur dioxide addition product of example 1 as a latent base in a cross-linkable ethylenically unsaturated polymer sealant composition in which cross-linking is initiated by exposure of the composition to atmospheric moisture.

The formulation of this sealant composition was:

| Components | Parts |
|---|---|
| Anhydrous crosslinkable ethylenically unsaturated polymer | 4.4 |
| Anhydrous terephthaloyl-bis(hydroximoyl chloride) | 0.7 |
| Di(sulfur dioxide) adduct of R—C 1,4-diazabicyclo[2.2.2]-octane | 1.0 |

The anhydrous cross-linkable ethylenically unsaturated polymer was a copolyester made by reacting 1,000 parts of bis(hydroxy-ethoxyethyl) dimerate and 175 parts of maleic anhydride. The crosslinkable polymer thus obtained had a molecular weight of 2,327, an acid number of 51.0, an ester number of 222.3, a hydroxyl number of 19.7, a fumarate ester content (calculated as fumaric acid) of 7.53 percent and a maleic ester content (calculated as maleic anhydride) of 4.91 percent.

The sealant composition of this formulation was made as follows. The anhydrous cross-linkable polymer and the anhydrous terephthaloyl-bis(hydroximoyl chloride) were dissolved in 17.8 parts of anhydrous tetrahydrofuran. The tetrahydrofuran was then removed in vacuo at 20°–25° C. The resulting heavy oil and the di(sulfur dioxide) adduct were then milled together in a mortar under an inert atmosphere until a homogeneous cream was obtained.

The cream itself could be stored at 20°–25° C. in the absence of moisture for several months without curing. However, when the cream was exposed to the open atmosphere as a film of ⅛-inch thickness, it cured integrally in 2 to 5 days.

Other compositions based on other di(sulfur dioxide) adducts of this invention and on the sulfur dioxide adducts of the compounds of formula II where Z is the R—C radical can be made in similar fashion with the latter adducts preferably being used in twice the molar quantity of the di(sulfur dioxide) adducts.

EXAMPLE 4

This example illustrates another cross-linkable polymer sealant composition of the type employing a latent base.

The formulation of a specific embodiment of this composition was:

| Components | Parts |
|---|---|
| Anhydrous crosslinkable polymer | 33 |
| Isophthaloyl-bis(hydrazide chloride) | 8.4 |
| Di(sulfur dioxide) adduct of 1,4-diazabicyclo[2.2.2]octane | 6 |

The cross-linkable polymer in this formulation was the same as that described in example 3.

The sealant composition of this formulation was made by dissolving the cross-linkable polymer and the anhydrous isophthaloyl-bis(hydrazide chloride) in 50 parts of anhydrous tetrahydrofuran, removing the tetrahydrofuran under subatmospheric pressure at 20°–25° C., and then admixing under a nitrogen atmosphere the resulting viscous oil with the di(sulfur dioxide) adduct until a homogeneous yellowish cream was obtained.

This composition could be stored in the absence of moisture for several months without curing. On the other hand, when cast as a film of ⅛-inch thickness and then exposed to the open atmosphere, it cured within 2 to 5 days to a rubber that was insoluble in tetrahydrofuran.

Other compositions based on other di(sulfur dioxide) adducts of this invention and on the sulfur dioxide adducts of the compounds of formula II where Z is the R—C radical can be made in similar fashion, with the latter adducts preferably being used in twice the molar quantity of the di(sulfur dioxide) adducts.

EXAMPLE 5

A mixture containing 40 parts of an ethylenically diunsaturated, linear urethane copolymer having a molecular weight of about 15,000, 4.6 parts of an ethylenically triunsaturated, branched urethane copolymer having a molecular weight of about 5,000 and 1.6 parts of bis(phenyl glyoxylohydroximoyl chloride) was prepared by dissolving the components in anhydrous tetrahydrofuran and subsequently removing the solvent under reduced pressure. The mixture then was milled under an atmosphere of nitrogen with 1.7 parts of a di(sulfur dioxide) adduct of triethylenediamine prepared essentially according to the procedure of example 1 except to use previously dried reagents and omit the treatment with Linde 4A molecular sieve pellets.

The homogeneous, pasty composition obtained from the milling operation was stable on storage for several months. However upon exposure as film to 80 percent humidity at room temperature, the composition cross-linked to a rubber product which was insoluble in tetrahydrofuran. Also, samples of the composition heated to 110° C. for 3 minutes or to 150° C. for 1 minute cross-linked to tough rubber products insoluble in tetrahydrofuran.

EXAMPLE 6

This example illustrates utilization of the sulfur dioxide addition product of example 1 as a cross-linking agent for unsaturated polyester compositions.

The formulation of the unsaturated polyester composition of this example was:

| Components | Parts |
|---|---|
| Unsaturated polyester | 100 |
| Di(sulfur dioxide) adduct of 1,4-diazabicyclo[2.2.2]octane | 1.2 |

The unsaturated polyester was a product made substantially as described in example 1 of U.S. Pat. No. 2,634,251 to Kass.

This composition in cross-linked condition was made by admixing the components in a closed vessel under nitrogen, and then establishing and maintaining for 2 hours the temperature of the mixture at 170° C. The resulting product was cross-linked, being insoluble in tetrahydrofuran. A sample of the polyester alone, when established and maintained for 2 hours under nitrogen at 170° C. remained soluble in tetrahydrofuran.

Other compositions based on other di(sulfur dioxide) adducts of this invention and on the sulfur dioxide adducts of the compounds of formula II wherein Z is the R—C radical can be made in similar fashion, with the quantities of the latter adducts preferably being greater so that in each case they are about twice the molar quantity of the di(sulfur dioxide) adduct.

EXAMPLE 7

This example illustrates utilization of the mono(sulfur dioxide) addition product of example 2 as a cross-linking agent for unsaturated polyester compositions.

The formulation of the unsaturated polyester composition of this example was:

| Components | Parts |
|---|---|
| Unsaturated polyester | 100 |
| Mono(sulfur dioxide) adduct of 1,4-diazabicyclo[2.2.2]octane | 5.0 |

The unsaturated polyester was a product made substantially as described in example 1 of U.S. Pat. No. 2,634,251 to Kass.

This composition in cross-linked condition was made by admixing the components in a closed vessel under nitrogen, and then establishing and maintaining for 2 hours the temperature of the mixture at 180° C. The resulting product was cross-linked, being insoluble in common solvents for the uncrosslinked polyester, such as tetrahydrofuran, methylene chloride and methyl isobutyl ketone. Other compositions based on other mono(sulfur dioxide) adducts of this invention can be made in similar fashion.

What I claim and desire to protect by Letters Patent is:

1. A cross-linkable polymer composition comprising an unsaturated polymer containing ethylenic unsaturation wherein there is at least one hydrogen radical attached to at least one of the carbon atoms of the ethylenic double bond and a sulfur dioxide addition product having the formula I 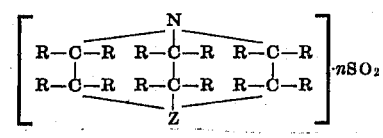

wherein Z is selected from the group consisting of N and R—C substituents, each R is independently selected from the group consisting of hydrogen and $C_1$–$C_3$ alkyl substitutents, $n$ is 1 when Z is a R—C substituent and $n$ is 1 or 2 when Z is N.

2. The cross-linkable polymer composition of claim 1 containing precursor material which when contacted with alkaline substance forms a cross-linking agent for said polymer, said precursor material being a polyfunctional hydroximoyl halide, carbonylnitriolic acid or hydrazide halide, and wherein the sulfur dioxide addition product acts as a latent base.

3. The composition of claim 2 wherein the precursor material is a polyfunctional carbonylnitrolic acid.

4. The composition of claim 2 wherein the precursor material is a polyfunctional hydrazide halide.

5. The composition of claim 2 wherein the precursor material is a polyfunctional hydroximoyl halide.

6. The composition of claim 5 wherein the sulfur dioxide addition product is the di(sulfur dioxide) adduct of triethylenediamine.

7. A process for cross-linking an unsaturated polymer containing ethylenic unsaturation wherein there is at least one hydrogen radical attached to at least one of the carbon atoms of the ethylenic double bond which comprises heating said polymer in admixture with a sulfur dioxide addition product having the formula

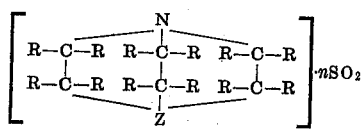

wherein Z is selected from the group consisting of N and R—C substituents, each R is independently selected from the group consisting of hydrogen and $C_1$–$C_3$ alkyl substituents, $n$ is 1 when Z is a R—C substituent and $n$ is 1 or 2 when Z is N.

8. The process of claim 7 wherein the admixture of said polymer and said sulfur dioxide addition product contains a precursor material which when contacted with alkaline substance forms a cross-linking agent for said polymer, said precursor material being a polyfunctional hydroximoyl halide, carbonylnitrolic acid or hydrazide halide, and wherein the sulfur dioxide addition product acts as a latent base.

9. The process of claim 8 wherein the precursor material is a polyfunctional hydroximoyl halide and the sulfur dioxide addition product is the di(sulfur dioxide) adduct of triethylenediamine.

10. A process for cross-linking an unsaturated polymer containing ethylenic unsaturation wherein there is at least one hydrogen radical attached to at least one of the carbon atoms of the ethylenic double bond which comprises exposing to moisture said polymer in admixture with a precursor material which when contacted with alkaline substance forms a cross-linking agent for said polymer, said precursor material being a polyfunctional hydroximoyl halide, carbonylnitrolic acid or hydrazide halide, and a latent base which is a sulfur dioxide addition product having the formula

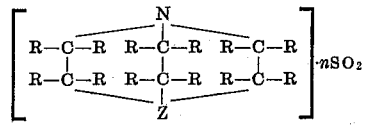

an unsaturated polymer containing ethylenic unsaturation wherein there is at least one hydrogen radical attached to at least one of the carbon atoms of the ethylenic double bond.

11. The process of claim 10 wherein the precursor material is a polyfunctional hydroximoyl halide and the sulfur dioxide addition product is the di(sulfur dioxide) adduct of triethylenediamine.

* * * * *

PO-1050
(5/69)

UNITED STATES PATENT OFFICE
CERTIFICATE OF CORRECTION

Patent No. __U.S.P. 3,627,715__     Dated __December 14, 1971__

Inventor(s) __Karl Brack (Case 18-23)__

It is certified that error appears in the above-identified patent and that said Letters Patent are hereby corrected as shown below:

Col. 5, Line 13 of p.p.; Page 10, Line 4 of spec.
"substantially of " -- should be -- "substantially all of"

Col. 5, Line 27 of p.p.; Page 10, Line 12 of spec.
"means" -- should be -- "meanings"

Col. 5, Line 43 of p.p.; Page 10, Line 27 of spec.
"higher and pressure" -- should be -- "higher and lower pressure"

Col. 6, Line 27 (approx.) of p.p.; Page 12, Line 11 of spec.
"%C    %N  %S" -- should be -- "%C  %H  %N  %S"

Col. 6, Line 45 (approx.) of p.p.; Page 12, Line 26 of spec.
"of R-C 1,4" -- should be -- "of 1,4-"

Col. 8, Line 61 of p.p.; Claim 2, Line 4 and 5 of spec.
"carbonylnitriolic" -- should be -- "carbonylnitrolic"

Col. 10 of p.p.; Claim 10, last 3 lines
"an unsaturated polymer containing ethylenic unsaturation wherein there is at least one hydrogen radical attached to at least one of the carbon atoms of the ethylenic double bond."
          -- should read --

"wherein Z is selected from the group consisting of N and R-C substituents, each R is independently selected from the group consisting of hydrogen and $C_1$-$C_3$ alkyl substituents, n is 1 when Z is a substituent and n is 1 or 2 when Z is N.

Signed and sealed this 23rd day of May 1972.

(SEAL)
Attest:

EDWARD M. FLETCHER, JR.                ROBERT GOTTSCHALK
Attesting Officer                      Commissioner of Patents